US012341673B2

(12) United States Patent
Mano et al.

(10) Patent No.: US 12,341,673 B2
(45) Date of Patent: Jun. 24, 2025

(54) COMMUNICATION APPARATUS, RELAY APPARATUS, COMMUNICATION SYSTEM, COMMUNICATION METHOD, AND PROGRAM

(71) Applicant: Nippon Telegraph and Telephone Corporation, Tokyo (JP)

(72) Inventors: Toru Mano, Musashino (JP); Hideki Nishizawa, Musashino (JP); Yukio Tsukishima, Musashino (JP); Tomoya Hibi, Musashino (JP); Junki Ichikawa, Musashino (JP); Kiwami Inoue, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/270,935

(22) PCT Filed: Jan. 13, 2021

(86) PCT No.: PCT/JP2021/000803
§ 371 (c)(1),
(2) Date: Jul. 5, 2023

(87) PCT Pub. No.: WO2022/153387
PCT Pub. Date: Jul. 21, 2022

(65) Prior Publication Data
US 2024/0064077 A1    Feb. 22, 2024

(51) Int. Cl.
*H04J 14/06* (2006.01)
*G06F 13/10* (2006.01)
(Continued)

(52) U.S. Cl.
CPC .................................. *H04L 43/08* (2013.01)

(58) Field of Classification Search
CPC ..... H04L 43/08; H04B 10/516; H04B 10/079; H04B 10/07953
See application file for complete search history.

(56) References Cited

U.S. PATENT DOCUMENTS 7,599,289 B2 * 10/2009 Caci ........................ H04L 49/90
370/230
8,964,581 B2    2/2015 Takara et al.
(Continued)

FOREIGN PATENT DOCUMENTS

JP    2003-348118    12/2003
JP    2004-297381    10/2004
(Continued)

*Primary Examiner* — Umar Cheema
*Assistant Examiner* — Golam Mahmud
(74) *Attorney, Agent, or Firm* — Fish & Richardson P.C.

(57) ABSTRACT

The communication apparatus includes: a processing device that processes communication data to be transmitted to and received from a partner apparatus; a transmission unit that transmits the communication data to the partner apparatus; an internal state measurement unit that measures a state related to transmission of the communication data between the processing device and the transmission unit and a determination unit that determines a communication mode in communication with the partner apparatus from the state. The transmission unit transmits the communication data to the partner apparatus in the determined communication mode.

13 Claims, 11 Drawing Sheets

(51) Int. Cl.
*H04L 9/28* (2006.01)
*H04L 9/32* (2006.01)
*H04L 12/66* (2006.01)
*H04L 43/08* (2022.01)

(56) References Cited

U.S. PATENT DOCUMENTS

| | | | |
|---|---|---|---|
| 9,882,751 B2* | 1/2018 | Mutoh | H04L 43/0882 |
| 10,014,971 B2* | 7/2018 | Koopferstock | H04L 47/39 |
| 10,225,008 B1* | 3/2019 | Vassilieva | H04J 14/021 |
| 10,389,473 B1* | 8/2019 | Vassilieva | H04J 14/0298 |
| 2006/0256716 A1* | 11/2006 | Caci | H04L 49/90 |
| | | | 370/535 |
| 2007/0147381 A1* | 6/2007 | Wilhelm | H04L 47/10 |
| | | | 370/392 |
| 2011/0293266 A1* | 12/2011 | Aoki | H04B 10/5161 |
| | | | 398/25 |
| 2012/0263068 A1 | 10/2012 | Morimoto et al. | |
| 2013/0188674 A1 | 7/2013 | Yamamoto | |
| 2014/0237136 A1* | 8/2014 | Mutoh | H04L 25/20 |
| | | | 709/233 |
| 2016/0204876 A1* | 7/2016 | Kamura | H04J 14/0227 |
| | | | 398/79 |
| 2017/0264388 A1* | 9/2017 | Watanabe | H04J 14/0227 |
| 2018/0076876 A1* | 3/2018 | Gerszberg | H04W 52/245 |
| 2018/0076921 A1* | 3/2018 | Koopferstock | H04L 47/39 |
| 2021/0135945 A1* | 5/2021 | Hibi | H04L 41/0866 |
| 2021/0314067 A1 | 10/2021 | Inui et al. | |
| 2022/0286762 A1* | 9/2022 | Namiki | H04Q 11/0062 |
| 2022/0311711 A1* | 9/2022 | Jepsen | H04L 47/27 |

FOREIGN PATENT DOCUMENTS

| | | |
|---|---|---|
| JP | 4032824 | 11/2007 |
| WO | WO 2020/031514 | 8/2021 |

* cited by examiner

[Fig.1]
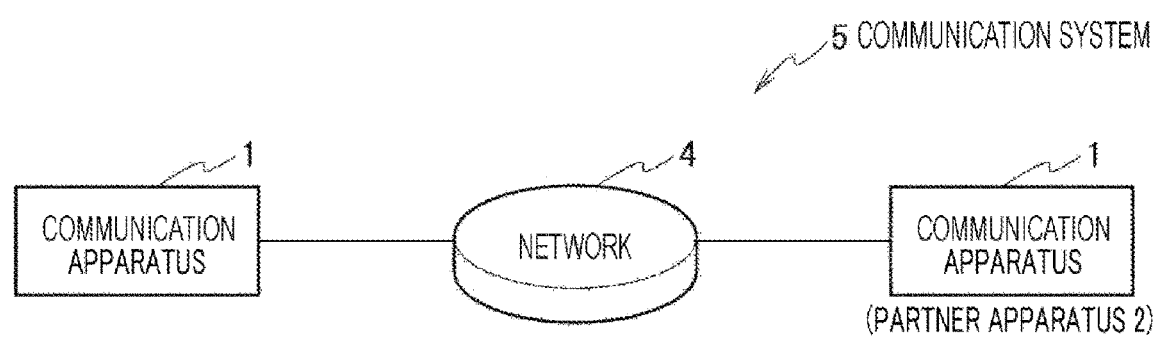

[Fig.2]
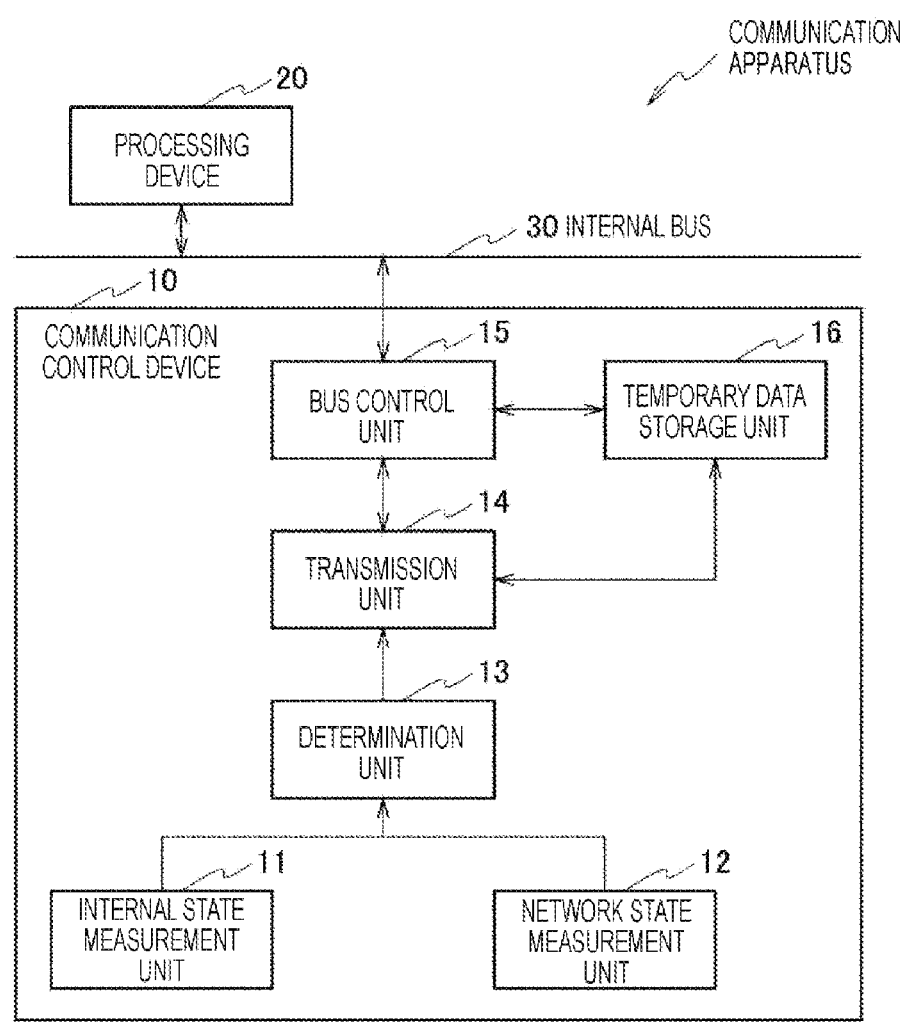

[Fig.3]
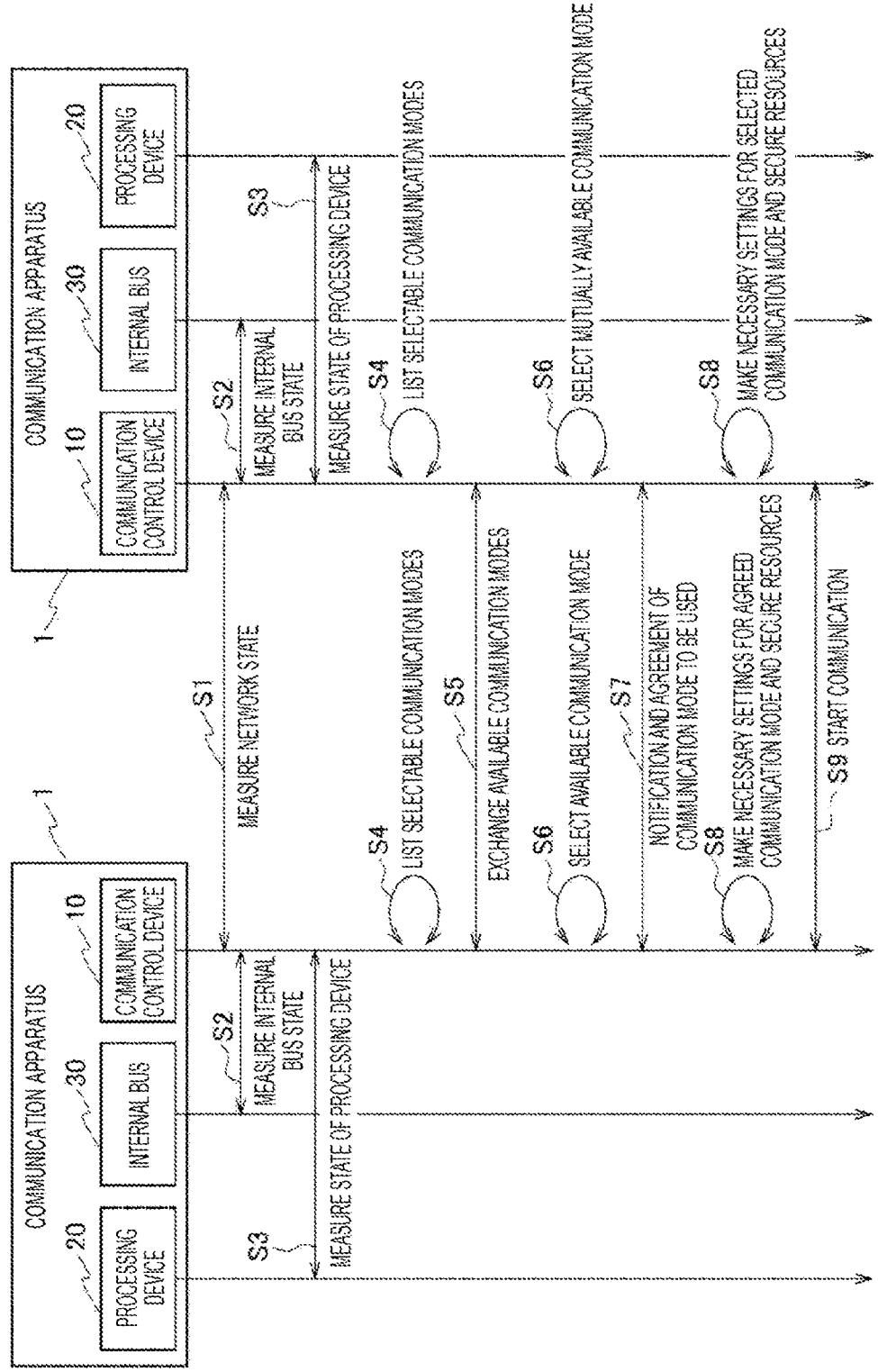

[Fig.4]
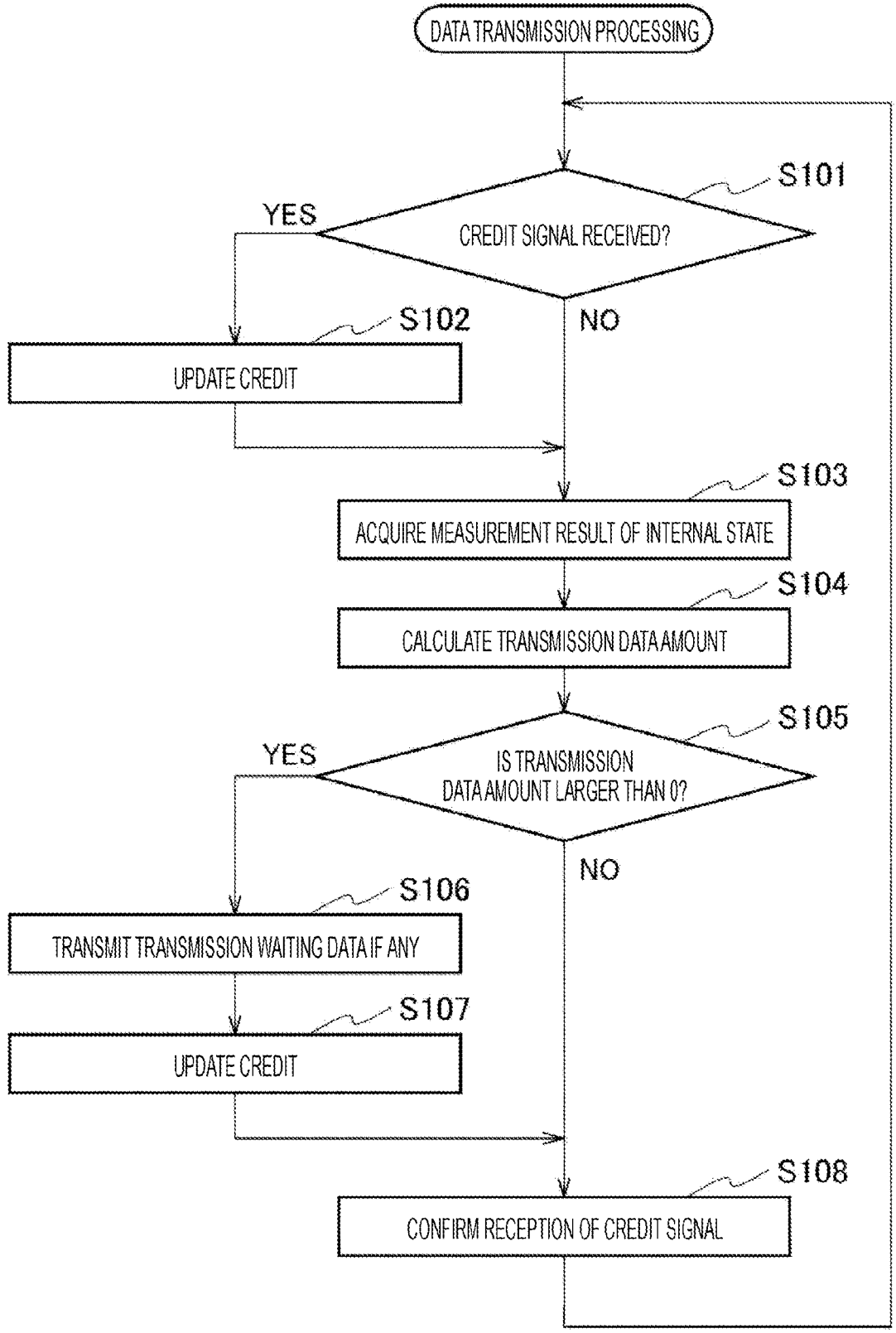

[Fig.5]
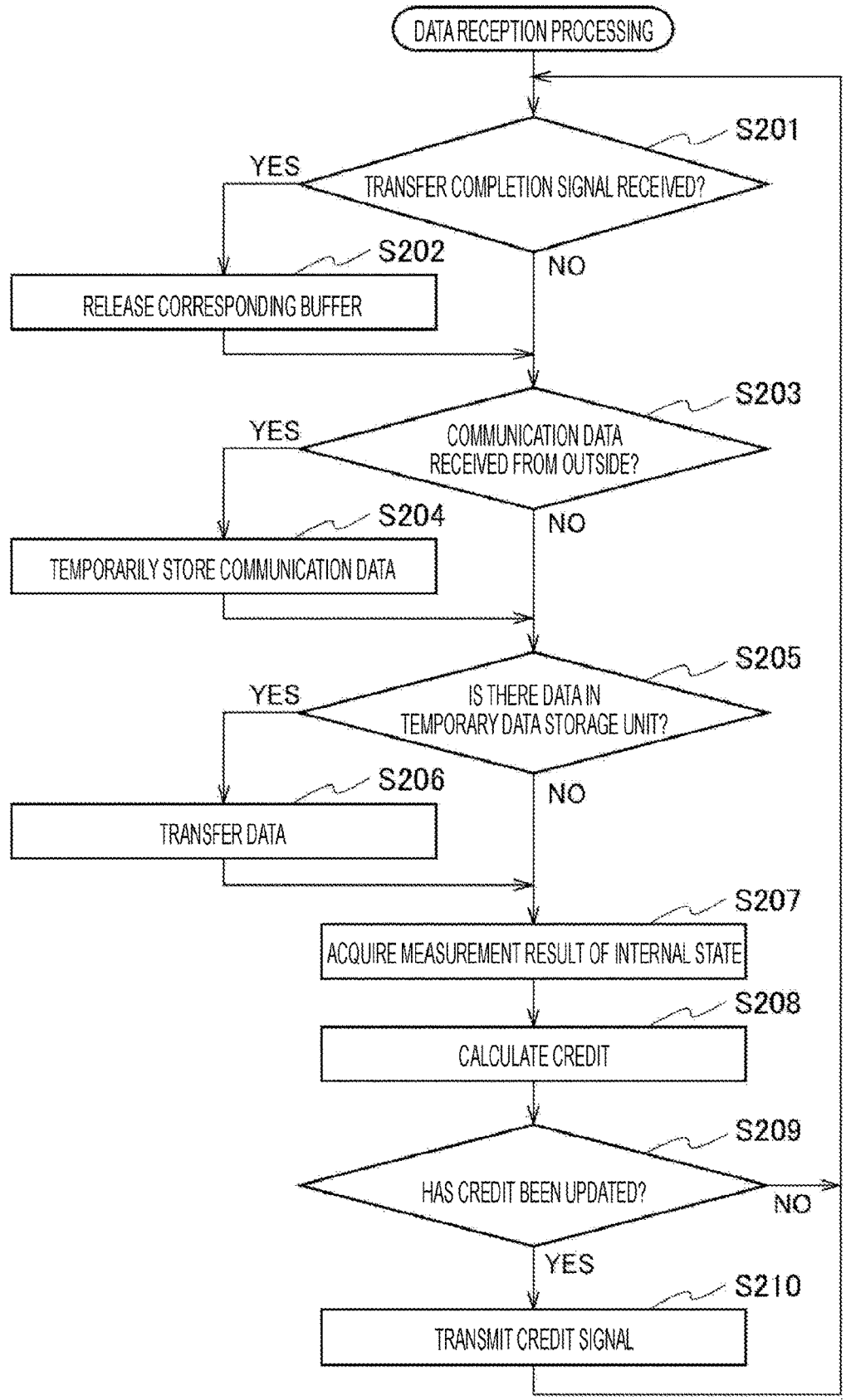

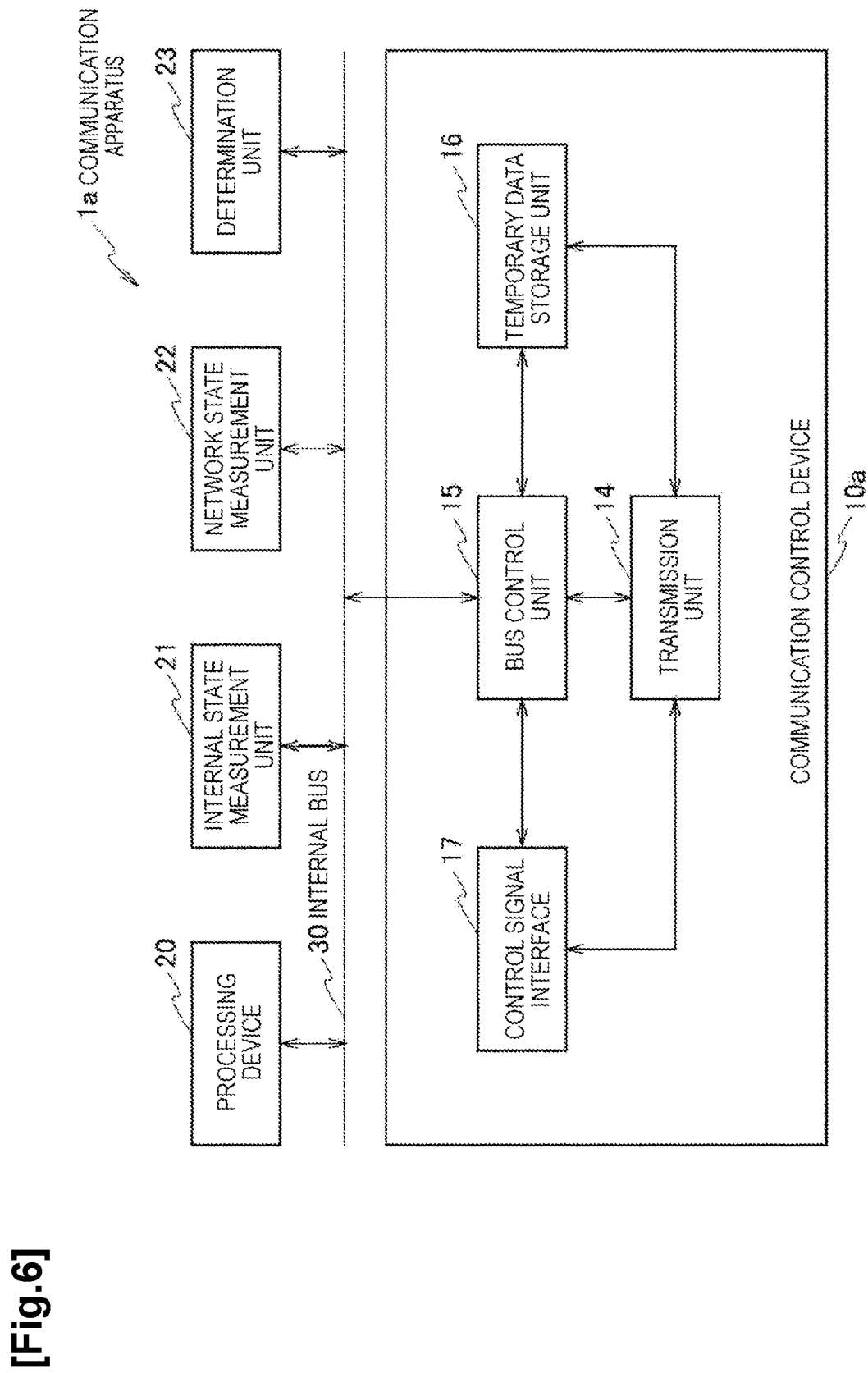
[Fig.6]

[Fig.7]
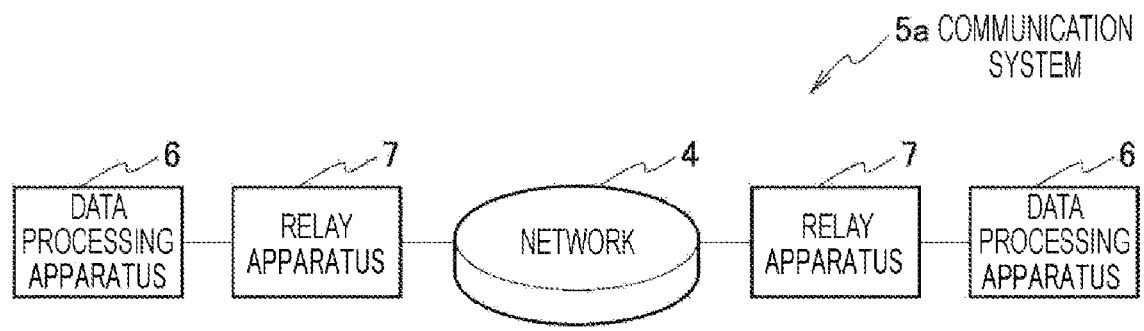

[Fig.8]
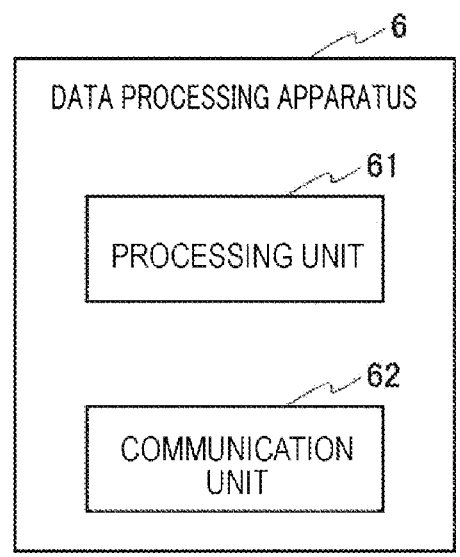

[Fig.9]
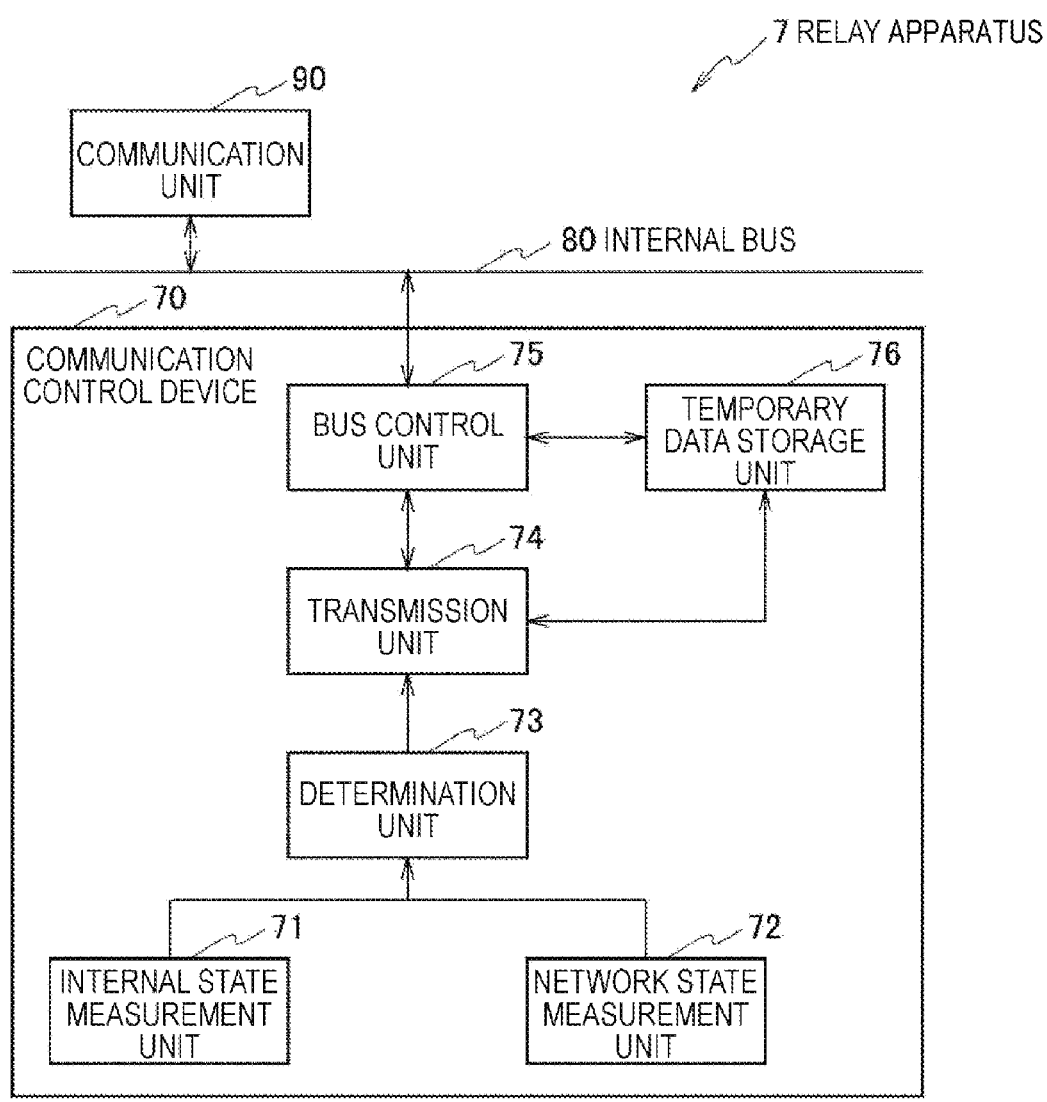

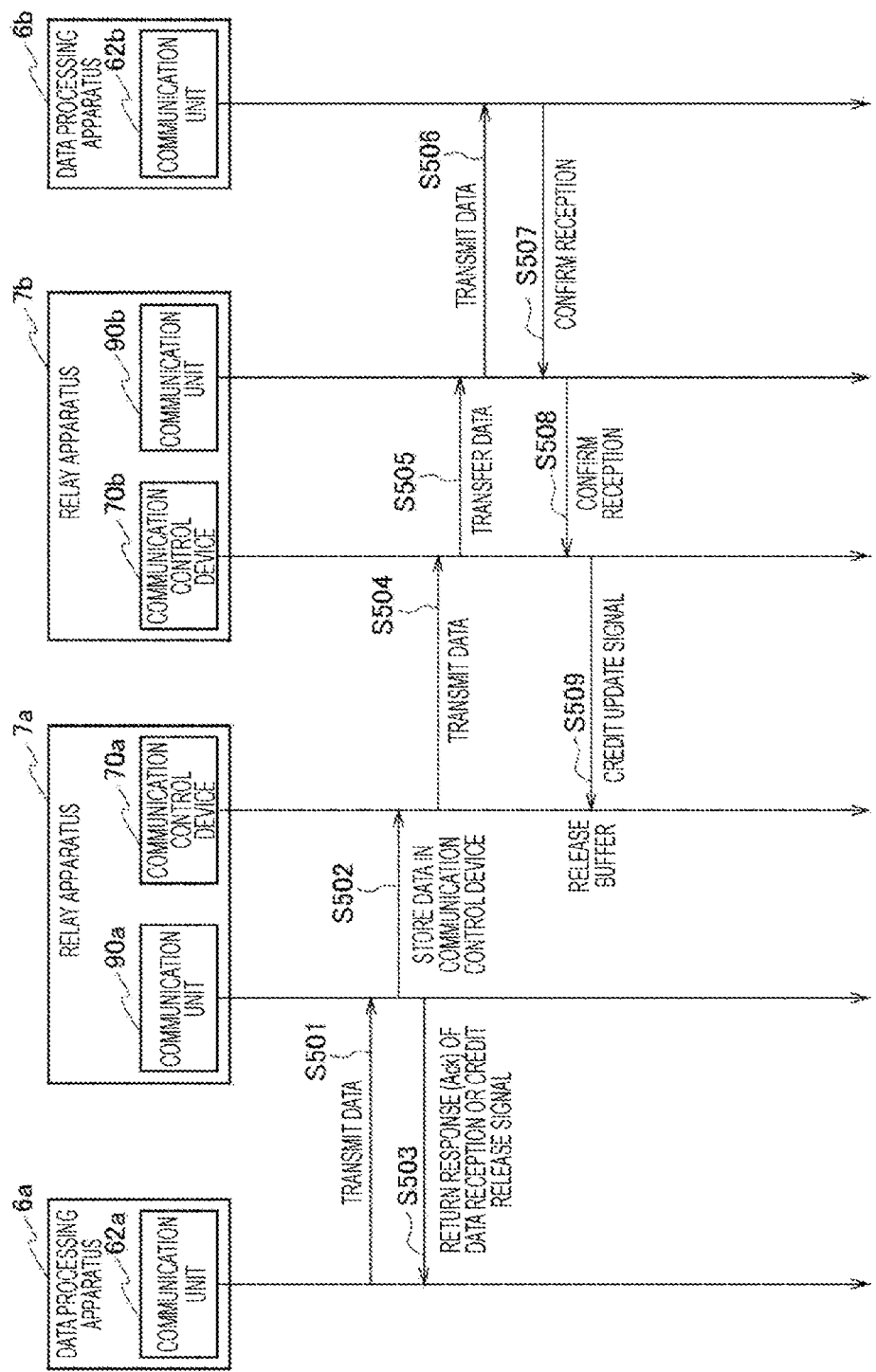

[Fig.11]
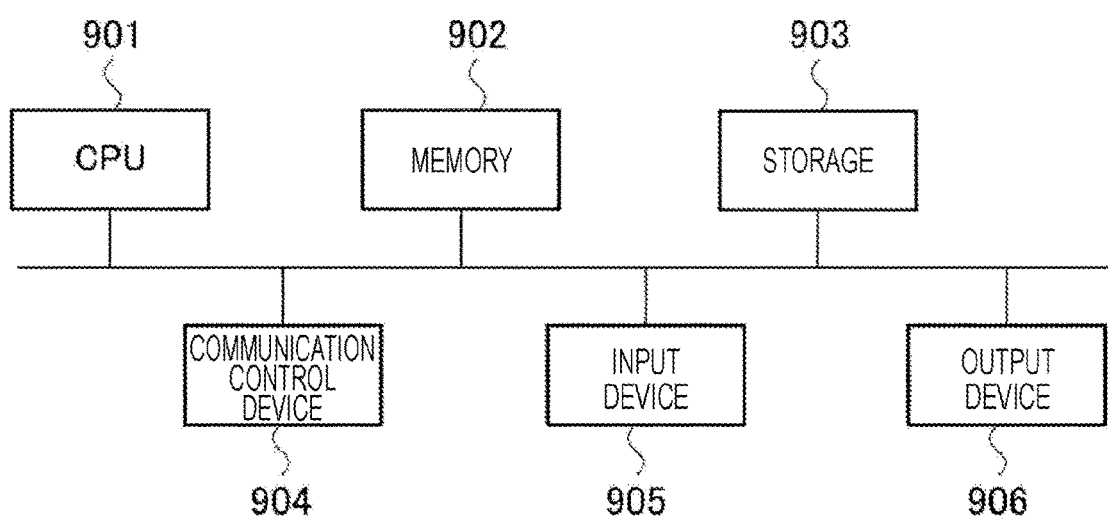

COMMUNICATION APPARATUS, RELAY APPARATUS, COMMUNICATION SYSTEM, COMMUNICATION METHOD, AND PROGRAM

CROSS-REFERENCE TO RELATED APPLICATIONS

This application is a National Stage application under 35 U.S.C. § 371 of International Application No. PCT/JP2021/000803, having an International Filing Date of Jan. 13, 2021.

The disclosure of the prior application is considered part of the disclosure of this application, and is incorporated by reference in its entirety into this application.

TECHNICAL FIELD

The present invention relates to a communication apparatus, a relay apparatus, a communication system, a communication method, and a program.

BACKGROUND ART

With the progress of communication technology, provision of a new network for connecting a wide band and a long distance has been studied. Conventionally, a system has been studied in which an apparatus such as a transponder mounted on an optical transmission system is mounted on a client system such as a server in a new network. In such a system, an electrical signal reaches a server or the like of a communication partner without being subjected to electro-optical conversion during transmission.

Generally, in an optical transmission system, there is a technique for suppressing network resources such as frequencies and establishing a high-speed transmission path by selecting an optimum communication mode from a network state (refer to Patent Literature 1 and Patent Literature 2). The network state is a distance, signal quality, or the like. The communication mode is a modulation method, a baud rate, the number of carriers, or the like. With such technology, it is possible to realize long-distance and high-speed communication between communication apparatuses with fewer network resources.

Examples of an existing communication protocol include Ethernet, TCP/IP (Transmission Control Protocol/Internet Protocol), InfiniBand, and PCI (Peripheral Component Interconnect) Express.

CITATION LIST

Patent Literature

Patent Literature 1: U.S. Pat. No. 8,964,581
Patent Literature 2: WO 2020/031514 A

SUMMARY OF INVENTION

Technical Problem

However, there is a possibility that long-distance and high-speed data communication cannot be realized by an existing communication protocol. With the recent speeding up of networks, a bottleneck in a network between communication apparatuses is eliminated, and a bottleneck tends to occur in a communication apparatus. However, since an existing communication protocol does not assume a situation in which a communication bottleneck occurs in a communication apparatus, the actual transfer speed may be significantly lower than that in a band available in the network. Moreover, even if the transmission system selects an optimum communication mode, utilization efficiency of network resources may be decreased in a case where the communication apparatus cannot efficiently use the communication mode.

The present invention has been made in view of the above circumstances, and an object thereof is to provide a technique capable of realizing high-speed communication by selecting a communication mode in consideration of a state of a communication apparatus.

Solution to Problem

A communication apparatus according to an aspect of the present invention includes: a processing device that processes communication data to be transmitted to and received from a partner apparatus; a transmission unit that transmits the communication data to the partner apparatus; an internal state measurement unit that measures a state related to transmission of the communication data between the processing device and the transmission unit; and a determination unit that determines a communication mode in communication with the partner apparatus from the state, in which the transmission unit transmits the communication data to the partner apparatus in the determined communication mode.

A relay apparatus according to an aspect of the present invention includes: a communication unit that communicates with a processing device that processes communication data to be transmitted to and received from a partner apparatus; a transmission unit that transmits the communication data to the partner apparatus; an internal state measurement unit that measures a state related to transmission of the communication data between the processing device and the transmission unit; and a determination unit that determines a communication mode in communication with the partner apparatus from the state, in which the transmission unit transmits the communication data to the partner apparatus in the determined communication mode, and the communication unit transmits the communication data transmitted by the transmission unit to the processing device.

A communication system according to an aspect of the present invention includes: a processing device that processes communication data to be transmitted to and received from a partner apparatus; a transmission unit that transmits the communication data to the partner apparatus; a plurality of communication apparatus including an internal state measurement unit that measures a state related to transmission of the communication data between the processing device and the transmission unit; and a determination unit that determines a communication mode in communication between the communication apparatus and the partner apparatus from states measured in the plurality of communication apparatuses, in which the transmission unit transmits the communication data to the partner apparatus in the determined communication mode.

A communication system according to an aspect of the present invention includes: a processing device that processes communication data to be transmitted to and received from a partner apparatus; and a relay apparatus connected with the processing device, in which the relay apparatus includes: a communication unit that communicates with the processing device; a transmission unit that transmits the communication data to the partner apparatus; an internal state measurement unit that measures a state related to transmission of the communication data between the processing device and the transmission unit; and a determination unit that determines a communication mode in communication with the partner apparatus from the state, the transmission unit transmits the communication data to the partner apparatus in the determined communication mode, and the communication unit transmits the communication data transmitted by the transmission unit to the processing device.

A communication method according to an aspect of the present invention includes: a step of measuring, by a communication apparatus, a state related to transmission of communication data between a processing device that processes the communication data to be transmitted to and received from a partner apparatus, and a transmission unit that transmits the communication data to the partner apparatus; a step of determining, by the communication apparatus, a communication mode in communication between the communication apparatus and the partner apparatus from the measured state; and a step of transmitting, by the communication apparatus, the communication data to the partner apparatus in the determined communication mode in the transmission unit.

An aspect of the present invention is a program for causing a computer to function as the communication apparatus or the relay apparatus.

Advantageous Effects of Invention

According to the present invention, it is possible to provide a technique capable of realizing high-speed communication by selecting a communication mode in consideration of a state of a communication apparatus.

BRIEF DESCRIPTION OF DRAWINGS

FIG. 1 is a diagram for explaining a system configuration of a communication system according to an embodiment of the present invention.

FIG. 2 is a block diagram illustrating a configuration of a communication apparatus according to an embodiment of the present invention.

FIG. 3 is a sequence diagram for explaining a communication method according to an embodiment of the present invention.

FIG. 4 is a flowchart for explaining data transmission processing in credit based flow control.

FIG. 5 is a flowchart for explaining data reception processing in credit based flow control.

FIG. 6 is a block diagram illustrating a configuration of a communication apparatus according to a first modified example.

FIG. 7 is a diagram for explaining a system configuration of a communication system according to a second modified example.

FIG. 8 is a block diagram illustrating a configuration of a processing device according to the second modified example.

FIG. 9 is a block diagram illustrating a configuration of a relay apparatus according to the second modified example.

FIG. 10 is a sequence diagram for explaining a communication method according to the second modified example.

FIG. 11 is a diagram for explaining a hardware configuration of a computer used for each of a communication apparatus, a processing device, and a relay apparatus.

DESCRIPTION OF EMBODIMENTS

Hereinafter, an embodiment of the present invention will be described with reference to the drawings. In the drawings, the same parts are denoted by the same reference signs, and description thereof will be omitted.

(Communication System)

A communication system 5 in which a communication apparatus 1 according to an embodiment of the present invention is used will be described with reference to FIG. 1. The communication system 5 includes a plurality of communication apparatuses 1 according to the embodiment of the present invention. The plurality of communication apparatuses 1 can communicate with each other in a plurality of communication modes through a network 4 connecting the plurality of communication apparatuses 1. A communication mode is a transmission mode in a predetermined communication protocol, and includes a modulation method, an error correcting system, a baud rate, the number of carriers, and the like. In the case of a communication protocol capable of performing credit based flow control, the communication mode may include a maximum transfer size, a buffer size secured by the partner apparatus 2, a credit update method, a credit transmission method, and a transmission data amount calculation method.

The communication system 5 adaptively changes the communication mode in consideration of not only the situation of the network 4 but also the situation of each communication apparatus 1. The communication system 5 increases utilization efficiency of resources of the communication apparatuses 1 and resources of the network, and realizes high-speed communication.

In the embodiment of the present invention, a case will be described in which a plurality of communication apparatuses 1 having similar functions mutually transmit and receive communication data. In the embodiment of the present invention, the communication data is data transmitted and received between the plurality of communication apparatuses 1. A packet in which communication data is set as a payload may be transmitted and received. The plurality of communication apparatuses 1 may be described as a communication apparatus 1 and a partner apparatus 2 that is a communication partner of the communication apparatus 1.

(Communication Apparatuses)

As illustrated in FIG. 1, the communication apparatus 1 includes a communication control device 10, a processing device 20, and an internal bus 30. The communication control device 10 and the processing device 20 are communicably connected with each other via the internal bus 30.

The communication control device 10 serves as an interface when the communication apparatus 1 communicates with the partner apparatus 2 via the network 4. The communication control device 10 is, for example, NIC (Network Interface Card). In the embodiment of the present invention, the communication control device 10 has a function for determining a communication mode in communication with the partner apparatus 2 in addition to a function of a general NIC.

The processing device 20 processes the communication data. The processing device 20 generates communication data, and causes the communication control device 10 to transmit the generated communication data to the partner apparatus 2 via the internal bus 30. Alternatively, the processing device 20 acquires communication data from the communication control device 10 via the internal bus 30, and processes the acquired communication data.

The processing device 20 may be any device as long as the device is connected with the internal bus 30 and processes communication data. The processing device 20 is, for example, a processing unit implemented by executing a predetermined program in a CPU 901. The processing device 20 may be a dedicated circuit such as FGPA (Field Programmable Gate Array), GPU (Graphics Processing Unit), or TPU (Tensor Processing Unit).

The internal bus 30 is a path for the communication control device 10 and the processing device 20 to transmit and receive data.

The communication control device 10 will be described. The communication control device 10 includes an internal state measurement unit 11, a network state measurement unit 12, a determination unit 13, a transmission unit 14, a bus control unit 15, and a temporary data storage unit 16.

The internal state measurement unit 11 measures a state related to transmission of communication data between the processing device 20 and the transmission unit 14. The internal state measurement unit 11 measures the state of the internal bus 30 and the state of each device connected with the internal bus 30, and specifies the quality of transmission of the communication data. A state of the internal bus 30 may be a maximum transfer band at the time of measurement, a congestion state, a delay from the transmission unit 14 to each device, a loss rate, jitter, or the like. A state of each device is a maximum transfer speed, an error correction capability, or the like. Each data measured by the internal state measurement unit 11 is taken into consideration by the determination unit 13.

The network state measurement unit 12 measures the state of the network 4 between the communication apparatus 1 and the partner apparatus 2. The state of the network 4 includes transmission quality such as delay, a loss rate, jitter, or OSNR (Optical Signal-to-Noise Ratio). Each data measured by the network state measurement unit 12 is taken into consideration by the determination unit 13.

The determination unit 13 determines a communication mode in communication with the partner apparatus 2 from the state measured by the internal state measurement unit 11.

For example, the determination unit 13 specifies a part inside the communication apparatus 1, which is the bottleneck, by using the internal state measurement unit 11, and extracts communication modes capable of realizing a communication speed corresponding to the bottleneck. The determination unit 13 determines an optimum communication mode from the extracted communication modes.

The determination unit 13 further determines a communication mode from the state related to transmission of the communication data in the partner apparatus 2. The determination unit 13 may further determine a communication mode in consideration of the state of the network 4 measured by the network state measurement unit 12 and the free capacity in the temporary data storage unit 16. The determination unit 13 selects a communication mode available in the communication apparatus 1 and the partner apparatus 2 from the state in the communication apparatus 1, the state in the partner apparatus 2, and the like, and determines an optimum communication mode from the communication modes available in the communication apparatus 1 and the partner apparatus 2 on the basis of a predetermined index. The index for determining the optimum communication mode is preliminarily given by the administrator of the network 4, the administrator of the communication apparatus 1, or the like.

The determination unit 13 may adopt any method as long as it is possible to determine an optimum communication mode from the state in the communication apparatus 1 and the state in the partner apparatus 2 and share the determined communication mode with the partner apparatus 2. For example, the determination unit 13 of the communication apparatus 1 may acquire information on the partner apparatus 2 and determine an optimum communication mode from the state in the communication apparatus 1 and the information acquired from the partner apparatus 2. In this case, the determination unit 13 transmits the determined communication mode to the partner apparatus 2. The state of the partner apparatus 2 acquired by the determination unit 13 may be internal measurement data measured in the partner apparatus 2 or a list of communication modes available by the partner apparatus 2. As another method, the determination unit 13 of the communication apparatus 1 may transmit internal information acquired by the internal state measurement unit 11 to the partner apparatus 2, and determine the communication mode notified by from the partner apparatus 2 as the optimum communication mode. Here, the internal information transmitted by the determination unit 13 to the partner apparatus may be measurement data by the internal state measurement unit 11 or a list of communication modes available by the communication apparatus 1.

When the determination unit 13 determines a communication mode to be used for communication with the partner apparatus 2, resources inside the communication apparatus 1 necessary for executing this communication mode are secured. Specifically, the determination unit 13 secures an area of the temporary data storage unit 16, secures or occupies a band of the internal bus 30, or occupies a device of each device such as the processing device 20 or the like. If possible by using the specification of the internal bus 30, the determination unit 13 may occupy or secure a band of the internal bus 30.

The transmission unit 14 prepares for securing resources and the like inside the communication apparatus 1 in order to perform communication in the communication mode determined by the determination unit 13. The transmission unit 14 transmits communication data to the partner apparatus 2 in the communication mode determined by the determination unit 13.

The bus control unit 15 is an interface through which the communication control device 10 is connected with the internal bus 30. The bus control unit 15 receives data transmitted from the processing device 20 and stores the data in the temporary data storage unit 16, or transfers data stored in the temporary data storage unit 16 to the processing device 20. The bus control unit 15 further secures resources in the respective devices such as the internal bus 30 and the processing device 20 under the control of the determination unit 13.

The temporary data storage unit 16 is a memory area that temporarily stores communication data or the like transmitted and received by the transmission unit 14.

A communication method according to an embodiment of the present invention will be described with reference to FIG. 3. Although a case where two communication apparatuses 1 simultaneously perform the same processing will be described in the example illustrated in FIG. 3, what is required is that two communication apparatuses 1 can agree on a communication mode to be used among communication modes selectable by the respective communication apparatuses 1, and the processing may be executed in any procedure.

In step S1, each communication apparatus 1 measures the state of the network 4. In step S2, each communication apparatus 1 measures the state of the internal bus of each apparatus. In step S3, each communication apparatus 1 measures the state of the processing device 20 of each apparatus.

In step S4, each communication apparatus 1 lists available communication modes from the measurement results of steps S1 to S3. In step S5, each communication apparatus 1 exchanges communication modes selectable by each communication apparatus 1. In step S6, each communication apparatus 1 selects an available communication mode. In step S7, the communication apparatuses 1 notify each other of a communication mode to be used, and agree on the communication mode to be used.

In step S8, each communication apparatus 1 makes necessary settings for the communication mode agreed in step S7, and secures resources. In step S9, each communication apparatus 1 starts communication in the communication mode agreed in step S7.

The communication apparatus 1 according to the embodiment of the present invention can select a communication mode in consideration of the internal state of the communication apparatus 1 in addition to the state of the network 4. The communication system 5 according to the embodiment of the present invention can realize high-speed communication by effectively using resources in the communication system 5.

For example, as the communication mode, an optimum maximum transfer size is set in a communication system capable of performing high-speed and long-distance communication. For example, in a case where the transmission delay is 100 ms and the transmission speed can be 100 Gbps, the communication apparatus 1 sets a value exceeding 100 Gbps*100 ms=1.25 Gbyte as the maximum transfer size. Moreover, the communication apparatus 1 secures a buffer exceeding the maximum transfer size. As a result, the communication apparatuses 1 can communicate with each other by taking advantage of the transmission speed that can be provided by the communication system 5.

Moreover, in a case where the communication apparatus 1 lacks resources corresponding to the speed provided by the communication system 5, an excessive speed of the communication system 5 can be suppressed by changing the modulation method of the communication system 5. The communication system 5 can efficiently use the resources of the network 4 by further improving the error tolerance or reducing the frequencies to be used.

Transmission processing and reception processing will be described as processing of the transmission unit 14 in a case where a communication protocol capable of credit based flow control is used. The determination unit 13 also determines a credit update method, a transmission data amount calculation method, and the like as communication modes. Moreover, the communication control device 10 includes a credit management unit (not illustrated). The credit management unit manages data related to credit based flow control such as credit.

First, transmission processing will be described. The communication data transmitted by the transmission unit 14 is transferred from the processing device 20 to the communication control device 10 and stored in the temporary data storage unit 16.

When receiving a credit signal from the partner apparatus 2, the transmission unit 14 updates the credit stored in the credit management unit by the credit update method specified by the content of the credit signal and the communication mode determined by the determination unit 13. The credit signal received from the partner apparatus 2 includes information indicating the amount of data receivable by the partner apparatus 2 (Kung & Morris, Credit-based flow control for ATM networks, IEEE Network, 9(2), 40-48 (1995)). Moreover, the credit signal may include an internal state in the partner apparatus 2.

The transmission unit 14 calculates the transmission data amount. The data amount is calculated from a history of the credit value and a measurement result acquired from the internal state measurement unit 11 in addition to a transmission data amount calculation method specified in the communication mode determined by the determination unit 13 and the current value of the credit stored in the credit management unit.

In a case where the transmission data amount is larger than 0 and there is transmission waiting data, the transmission unit 14 transmits the data. After the data transmission, the transmission unit 14 updates the credit value of the credit management unit.

In the calculation of the transmission data amount, the transmission unit 14 regards the free capacity of the internal buffer of the partner apparatus 2 as the transmission data amount, and transmits data within the free capacity of the internal buffer of the partner apparatus 2. For example, the transmission unit 14 may estimate the free capacity of the internal buffer of the partner apparatus 2 from the release notification history of the credit signal received from the partner apparatus, and transmit data within the estimated free capacity. The transmission unit 14 may transmit, for example, an amount exceeding the receivable data amount notified by the partner apparatus 2 as long as the amount is within the estimated free capacity of the internal buffer. Moreover, in a case where the retransmission cost is estimated to be small, or in a case where it is estimated that there is a free capacity in the internal buffer of the partner apparatus 2 by the time the communication data reaches the partner apparatus 2, the transmission unit 14 may transmit an amount exceeding the receivable data amount notified by the partner apparatus 2. As a result, the communication system 5 can improve the efficiency of data communication in the credit based flow control.

Processing related to data transmission performed by the transmission unit 14 in the credit based flow control will be described with reference to FIG. 4.

When receiving a credit signal in step S101, the transmission unit 14 updates the data of the credit management unit in step S102. In step S103, the transmission unit 14 acquires a measurement result of the internal state measured by the internal state measurement unit 11. In step S104, the transmission unit 14 calculates the transmission data amount.

In step S105, in a case where the transmission data amount calculated in step S104 is larger than 0, the transmission unit 14 transmits data if there is transmission waiting data in step S106, and updates the data of the credit management unit in step S107. In step S108, the transmission unit 14 confirms the reception of the credit signal from the partner apparatus 2, and the process returns to step S101.

Next, reception processing will be described.

The transmission unit 14 stores the communication data received from the partner apparatus 2 in the temporary data storage unit 16. The communication data is transferred to the processing device 20 via the bus control unit 15 and the internal bus 30. When receiving a transfer completion signal of the communication data from the processing device 20, the temporary data storage unit 16 releases an area where the communication data is stored. Note that some data stored in the temporary data storage unit 16 may be processed by the communication control device 10.

The transmission unit 14 updates the credit stored in the credit management unit according to the credit update method specified in the communication mode determined by the determination unit 13. The transmission unit 14 refers to the internal state of the communication apparatus 1 measured by the internal state measurement unit 11, the history of the credit, and the like, and updates the credit from the credit stored in the credit management unit. When the credit is updated, the transmission unit 14 transmits an updated credit signal to the partner apparatus 2.

Processing related to data reception performed by the transmission unit 14 in the credit based flow control will be described with reference to FIG. 5.

When receiving a transfer completion signal of the communication data from the processing device 20 in step S201, the transmission unit 14 releases a corresponding buffer of the temporary data storage unit 16 in step S202.

When receiving communication data from the network 4 in step S203, the transmission unit 14 stores the communication data in the temporary data storage unit 16 in step S204.

In a case where there is data in the temporary data storage unit 16 in step S205, the transmission unit 14 transfers the data in the temporary data storage unit 16 in step S206. At this time, the transmission unit 14 transfers the data to an appropriate transfer destination such as the internal bus 30 or a circuit in the communication control device 10.

In step S207, the transmission unit 14 acquires a measurement result of the internal state of the internal state measurement unit 11. In step S208, the transmission unit 14 calculates the credit from the measurement result of the internal state acquired in step S207 and the like.

In step S209, the transmission unit 14 determines whether the credit has been updated or not. In a case where the credit has not been updated, the process returns to step S201. In a case where the credit has been updated, the transmission unit 14 transmits a credit signal to the partner apparatus 2 in step S210.

Here, even in a case where the free capacity of the temporary data storage unit 16 is insufficient from the history of the credit, the state of the network 4, the internal state, and the like, transfer of the communication data to the internal bus may be expected when the communication data is received from the partner apparatus 2. In that case, the transmission unit 14 can improve the data communication efficiency by releasing more credit and transmitting a credit signal to the partner apparatus 2.

In a conventional communication system, even if an appropriate communication mode is selected and a broadband communication path is established between communication apparatuses with a small number of network resources, a bottleneck tends to occur in the communication apparatuses. As a result, not only high-speed communication cannot be realized between communication apparatuses, but also utilization efficiency of network resources may be decreased.

On the other hand, the communication system 5 according to the embodiment of the present invention can select and adaptively change the communication mode in consideration of not only the state of the network 4 but also the internal state of the communication apparatus 1. Therefore, high-speed communication is realized between communication apparatuses, and utilization efficiency of network resources can be improved.

For example, in a case where a sufficient buffer size can be secured in the temporary data storage unit 16 in the communication apparatus 1, high-speed communication can be performed using a broadband communication path by increasing the maximum available transfer size depending on the transmission delay and the state of the network 4. On the other hand, in a case where a sufficient buffer size cannot be secured, it is possible to improve the error tolerance or reduce the used frequency by changing the communication mode such as the modulation mode and the used frequency, for example, and it is therefore possible to reduce the retransmission cost or realize efficient use of the frequency resources.

First Modified Example

A communication apparatuses 1*a* according to the first modified example will be described with reference to FIG. 6. The partner apparatus 2 illustrated in FIG. 1 may have a similar configuration illustrated in FIG. 6.

The communication apparatus 1*a* illustrated in FIG. 6 is different from the communication apparatus 1 illustrated in FIG. 2 in that an internal state measurement unit 21, a network state measurement unit 22, and a determination unit 23 are not provided in a communication control device 10*a* but are connected with the internal bus 30. The internal state measurement unit 21, the network state measurement unit 22, and the determination unit 23 may be implemented by processing a program by using the CPU 901, or may be implemented by a dedicated circuit or the like. Moreover, some of the internal state measurement unit 21, the network state measurement unit 22, and the determination unit 23 may be mounted on the communication control device 10*a*, and some thereof may be mounted on a device other than the communication control device 10*a* connected with the internal bus 30.

In a case where the internal state measurement unit 21, the network state measurement unit 22, or the determination unit 23 is connected with the internal bus 30, the control signal interface 17 of the communication control device 10*a* controls transmission and reception of data between the transmission unit 14 and the internal state measurement unit 21, the network state measurement unit 22, or the determination unit 23 via the internal bus 30.

Moreover, some functions performed by the transmission unit 14, for example, a function of calculating the transmission data amount or managing the credit may be implemented not in the communication control device 10*a* but by a device connected with the internal bus 30. Here, the device connected with the internal bus 30 may be the CPU 901, or a device other than the CPU 901 that controls the communication control device 10*a*. Some of the plurality of functions performed by the transmission unit 14 may be implemented by the CPU 901, and some of the functions may be implemented by a device that controls the communication control device 10*a*. Furthermore, a temporary data storage unit 16 mounted on the communication control device 10*a* may be mounted on a memory or the like connected with the internal bus 30.

As described above, the internal state measurement unit 21, the network state measurement unit 22, or the determination unit 23 may be implemented in the communication apparatus 1*a* by any means or device.

Second Modified Example

A case has been described in which the processing device 20 that processes communication data and the communication control device 10 having a function of selecting a communication mode are mounted on the same device in the embodiment of the present invention. In the second modified example, a case will be described in which a data processing apparatus 6 that processes communication data and a communication control device 70 are mounted on different devices.

As illustrated in FIG. 7, in a communication system 5a according to the second modified example, the data processing apparatus 6 that processes communication data is connected with a network 4 via a relay apparatus 7. The data processing apparatus 6 is connected with the relay apparatus 7. The relay apparatus 7 is connected with the data processing apparatus 6 and the network 4.

The data processing apparatus 6 will be described with reference to FIG. 8. The data processing apparatus 6 includes a processing unit 61 and a communication unit 62. The processing unit 61 processes communication data to be transmitted to and received from a partner apparatus. The communication unit 62 communicates with the relay apparatus 7. The communication unit 62 may be a general communication control device such as an NIC, and may not have the function of determining a communication mode described in the embodiment of the present invention.

The relay apparatus 7 will be described with reference to FIG. 9. The relay apparatus 7 includes the communication control device 70, a communication unit 90, and an internal bus 80. The communication control device 70 has a function similar to that of the communication control device 10 of the communication apparatus 1 described with reference to FIG. 2. Each of an internal state measurement unit 71, a network state measurement unit 72, a determination unit 73, a transmission unit 74, a bus control unit 75, and a temporary data storage unit 76 of the communication control device 70 corresponds to each of the internal state measurement unit 11, the network state measurement unit 12, the determination unit 13, the transmission unit 14, the bus control unit 15, and the temporary data storage unit 16 of the communication control device 10 described with reference to FIG. 2. The communication unit 90 communicates with the data processing apparatuses 6. The communication unit 90 may be a general communication control device such as an NIC, and may not have the function of determining a communication mode described in the embodiment of the present invention.

The transmission unit 74 of the relay apparatus 7 transmits communication data to the partner apparatus 2 in the communication mode determined by the determination unit 73. The communication unit 90 transmits the communication data transmitted by the transmission unit 74 to the data processing apparatus 6.

In the communication system 5a, the relay apparatuses 7 that are connected via the network 4 communicate with each other in the communication method according to the embodiment of the present invention, specifically, in a communication mode selected from the internal states between the data processing apparatuses 6 and the relay apparatuses 7. The data processing apparatuses 6 and the relay apparatuses 7 communicate with each other by a general communication method. According to such a communication system 5a, it is possible to increase the utilization efficiency of network resources and respective apparatuses such as the data processing apparatuses 6 and the relay apparatuses 7 and to thereby realize high-speed communication by using the communication method according to the embodiment of the present invention without modifying a conventional data processing apparatus 6. Moreover, the relay apparatus 7 may include a plurality of general communication control devices, and each communication control device may be connected with a plurality of data processing apparatuses 6. Therefore, the relay apparatus 7 can communicate with the plurality of data processing apparatuses 6 in the communication mode determined from the internal states.

A communication method according to the second modified example will be described with reference to FIG. 10. In the example illustrated in FIG. 10, a case where a data processing apparatus 6a transmits data to a data processing apparatus 6b will be described. The data processing apparatus 6a is connected with a relay apparatus 7a. The data processing apparatus 6b is connected with a relay apparatus 7b. The relay apparatuses 7a and 7b are connected with the network 4. Moreover, it is assumed that the communication mode is already shared by the relay apparatus 7a and the relay apparatus 7b.

In step S501, a communication unit 62a of the data processing apparatus 6a transmits communication data to the relay apparatus 7a. In step S502, a communication unit 90a of the relay apparatus 7a stores the received communication data in the temporary data storage unit 76 of a communication control device 70a. In step S503, the communication unit 90a returns a data reception response to the communication unit 62a of the data processing apparatus 6a. In a case where the credit based flow control is performed between the communication unit 90a and the communication unit 62a, the data reception response may be a credit release signal. In step S504, the communication control device 70a transmits the communication data to a communication control device 70b of the relay apparatus 7b via the network 4.

In step S505, the communication control device 70b of the relay apparatus 7b transfers the communication data to a communication unit 90b. In step S506, the communication unit 90b transmits the communication data to a communication unit 62b of the data processing apparatus 6b. In step S507, the communication unit 62b transmits a reception confirmation to the communication unit 90b. In step S508, the communication unit 90b transmits a reception confirmation to the communication control device 70b. In step S509, the communication control device 70b transmits a credit update signal to the communication control device 70a of the relay apparatus 7a.

When receiving the credit update signal, the communication control device 70a of the relay apparatus 7a deletes the communication data stored in the temporary data storage unit 76 and releases the buffer.

As described above, according to the relay apparatus 7 according to the second modified example, it is possible to realize the communication method according to the embodiment of the present invention without modifying an existing processing device.

Also in the relay apparatus 7 according to the second modified example, as described in the first modified example, the internal state measurement unit 71, the network state measurement unit 72, or the determination unit 73 may be implemented in the communication apparatus 1a by any means or device. Specifically, the internal state measurement unit 71, the network state measurement unit 72, or the determination unit 73 may be implemented not in the communication control device 70 but by the CPU 901, a dedicated circuit, or the like connected with the internal bus 80. Some functions performed by the transmission unit 74, for example, a function of calculating the transmission data amount or managing the credit may be implemented not in the communication control device 70 but by a device connected with the internal bus 80.

Each of the communication apparatus 1, the data processing apparatus 6, and the relay apparatus 7 of the present embodiment described above uses, for example, a general-purpose computer system including the central processing unit (CPU) 901, a memory 902, a storage 903 (hard disk drive (HDD) or solid state drive (SSD)), a communication control device 904, an input device 905, and an output device 906. In the computer system, the CPU 901 executes a program loaded on the memory 902, thereby implementing the respective functions of the communication apparatus 1, the data processing apparatus 6, and the relay apparatus 7.

Note that each of the communication apparatus 1, the data processing apparatus 6, and the relay apparatus 7 may be implemented by one computer or may be implemented by a plurality of computers. Moreover, each of the communication apparatus 1, the data processing apparatus 6, and the relay apparatus 7 may be a virtual machine mounted on a computer.

The program for each of the communication apparatus 1, the data processing apparatus 6, and the relay apparatus 7 can be stored in a computer-readable recording medium such as an HDD, an SSD, a universal serial bus (USB) memory, a compact disc (CD), or a digital versatile disc (DVD), or can be distributed via a network.

Note that the present invention is not limited to the above embodiment, and various modifications can be made within the scope of the gist of the present invention.

REFERENCE SIGNS LIST

1 Communication apparatus
2 Partner apparatus
4 Network
5 Communication system
6 Data processing apparatus
7 Relay apparatus
10 Communication control device
11, 21 Internal state measurement unit
12, 22 Network state measurement unit
13, 23 Determination unit
14 Transmission unit
15 Bus control unit
16 Temporary data storage unit
17 Control signal interface
20 Processing device
30 Internal bus
901 CPU
902 Memory
903 Storage
904 Communication control device
905 Input device
906 Output device

The invention claimed is:

1. A communication apparatus comprising:
a processing device that processes communication data to be transmitted to and received from a partner apparatus;
a network interface card (NIC); and
an internal bus connecting the processing device and the NIC, wherein the processing device is one or more selected from CPU (Central Processing Unit), FGPA (Field Programmable Gate Array), GPU (Graphics Processing Unit), and TPU (Tensor processing unit);
the NIC comprising:
  a transmission unit, including one or more processors, configured to transmit the communication data from the communication apparatus to the partner apparatus;
  an internal state measurement unit, including one or more processors, configured to measure a state of the internal bus, inside the communication apparatus, that connects the processing device to the NIC within the communication apparatus; and
a determination unit, including one or more processors, configured to determine a communication mode for communication with the partner apparatus based, at least in part, on the state of the internal bus;
wherein:
  the transmission unit is configured to transmit the communication data to the partner apparatus using the determined communication mode;
  the determination unit is configured to determine a part inside the communication apparatus that is a bottleneck limiting communication speed of the communication apparatus; and
  the determination unit is configured to determine the communication mode for communication with the partner apparatus based on a communication speed corresponding to the bottleneck.

2. The communication apparatus according to claim 1, wherein the determination unit is further configured to determine the communication mode from a state related to transmission of the communication data in the partner apparatus.

3. The communication apparatuses according to claim 1, wherein the transmission unit is configured to transmit data within a free capacity of an internal buffer of the partner apparatus.

4. A communication system comprising:
a plurality of communication apparatuses including a communication apparatus and a partner apparatus that communicate with each other over a network;
the communication apparatus comprising:
  a processing device that processes communication data to be transmitted to and received from the partner apparatus;
  a network interface card (NIC); and
  an internal bus connecting the processing device and the NIC, wherein the processing device is one or more selected from CPU (Central Processing Unit), FGPA (Field Programmable Gate Array), GPU (Graphics Processing Unit), and TPU (Tensor processing unit);
the NIC comprising:
  a transmission unit, including one or more processors, configured to transmit the communication data from the communication apparatus to the partner apparatus;
  an internal state measurement unit, including one or more processors, configured to measure a state of the internal bus, inside the communication apparatus, that connects the processing device to the NIC within the communication apparatus; and
  a determination unit, including one or more processors, configured to determine a communication mode for communication between the communication apparatus and the partner apparatus based, at least in part, on of state of the internal bus;
wherein:
  the transmission unit is configured to transmit the communication data to the partner apparatus using the determined communication mode;

the determination unit is configured to determine a part inside the communication apparatus that is a bottleneck limiting communication speed of the communication apparatus; and the determination unit is configured to determine the communication mode for communication with the partner apparatus based on a communication speed corresponding to the bottleneck.

5. A non-transitory computer readable medium storing one or more instructions causing a computer to function as the communication apparatus according to claim 1.

6. The communication system according to claim 4, wherein the determination unit is further configured to determine the communication mode from a state related to transmission of the communication data in the partner apparatus.

7. The communication system according to claim 4, wherein the transmission unit is configured to transmit data within a free capacity of an internal buffer of the partner apparatus.

8. A communication method comprising:

measuring a state of an internal bus inside a communication apparatus, wherein the communication apparatus includes (a) a processing device that processes communication data to be transmitted and received from a partner apparatus, (b) a network interface card (NIC), and (c) an internal bus connecting the processing device and the NIC, wherein the processing device is one or more selected from CPU (Central Processing Unit), FGPA (Field Programmable Gate Array), GPU (Graphics Processing Unit), and TPU (Tensor processing unit);

determining a part inside the communication apparatus that is a bottleneck limiting communication speed of the communication apparatus;

determining a communication mode for communication between the communication apparatus and the partner apparatus based on the state of the internal bus and a communication speed corresponding to the bottleneck; and transmitting the communication data to the partner apparatus using the determined communication mode.

9. The communication method according to claim 8, further comprising:

determining the communication mode from a state related to transmission of the communication data in the partner apparatus.

10. The communication method according to claim 8, further comprising:

transmitting data within a free capacity of an internal buffer of the partner apparatus.

11. The communication apparatuses according to claim 3, wherein the transmission unit is configured to:

estimate the free capacity of the internal buffer of the partner apparatus from release notification history of credit signal received from the partner apparatus, and transmit data within the estimated free capacity.

12. The communication system according to claim 7, wherein the transmission unit is configured to:

estimate the free capacity of the internal buffer of the partner apparatus from release notification history of credit signal received from the partner apparatus, and transmit data within the estimated free capacity.

13. The communication method according to claim 10, further comprising:

estimating the free capacity of the internal buffer of the partner apparatus from release notification history of credit signal received from the partner apparatus, and transmitting data within the estimated free capacity.

* * * * *